United States Patent [19]

Kelley

[11] Patent Number: 5,500,562
[45] Date of Patent: Mar. 19, 1996

[54] POWER SWITCH ARRANGEMENT

[75] Inventor: Paul H. Kelley, Boca Raton, Fla.

[73] Assignee: Motorola, Inc., Schaumburg, Ill.

[21] Appl. No.: 212,097

[22] Filed: Mar. 14, 1994

[51] Int. Cl.[6] ........................................... H02J 9/04
[52] U.S. Cl. ................... 307/66; 307/64; 307/65; 368/64; 368/203; 368/204; 368/205
[58] Field of Search ................... 307/64, 65, 66; 368/64, 203, 204, 205

[56] References Cited

U.S. PATENT DOCUMENTS 4,182,110  1/1980  Kamiwaki .................................... 58/23
4,435,089  3/1984  Chihara ..................................... 368/204

*Primary Examiner*—William M. Shoop, Jr.
*Assistant Examiner*—Albert Paladini
*Attorney, Agent, or Firm*—Pablo Meles

[57] ABSTRACT

A split battery contact arrangement (10) for a low voltage portable electronic product having a first circuit (18) and second circuit (18) comprises a split positive battery contact having a first positive contact point (20) selectively isolatable from a second positive contact point (17), the first positive contact point being coupled to the first circuit (18) and the second circuit (16) being coupled to the second positive contact point. The arrangement further comprises a back-up energy source (24) coupled to the first positive contact point and a removable battery (12), which when removed selectively isolates the first circuit from the second circuit, thereby preventing the back-up energy source from powering the second circuit. When the removable battery is inserted, it couples the first circuit to the second circuit.

20 Claims, 1 Drawing Sheet

POWER SWITCH ARRANGEMENT

TECHNICAL FIELD

This invention relates generally to a power switching arrangement, and in particular, to a primary battery switch with a split battery contact.

BACKGROUND

In known circuits, the back-up battery is commonly coupled to the power supply via simple isolation diodes or series transistor switches. Both of these switching techniques are relatively inefficient and the use of isolation diodes is not practical at operating voltages below 2 volts. In a 1 volt application, such as a watch pager, the back-up cell or back-up capacitor will be connected to the entire system that was previously powered by the primary battery. If a power draining function such as an audio alert, lamp, or vibrator is being performed when the primary battery is removed, then the back-up power will quickly be depleted from the back-up cell or capacitor. The depletion can occur so quickly, that perhaps even a controlling microprocessor would be unable to turn off the power depleting portion of a circuit in time to prevent such a power drain. Additionally, using an integrated circuit or a microswitch capable of providing isolation of the back-up cell or back-up capacitor would involve more unnecessary parts and cost to such a product. Thus, there exists a need for a fail safe mechanism in a circuit to protect against the back-up cell or capacitor from sourcing current to a power draining portion of a circuit such as the alert, lamp or vibrator when the primary battery is removed from the circuit.

SUMMARY OF THE INVENTION

A split battery contact arrangement for a low voltage portable electronic product having a first circuit and second circuit comprises a split positive battery contact having a first positive contact point selectively isolatable from a second positive contact point, the first positive contact point being coupled to the first circuit and the second circuit being coupled to the second positive contact point. The arrangement further comprises a back-up energy source coupled to the first positive contact point and a removable battery, which when removed selectively isolates the first circuit from the second circuit and which when inserted couples the first circuit to the second circuit.

DETAILED DESCRIPTION OF THE PREFERRED EMBODIMENT

Figure 1:
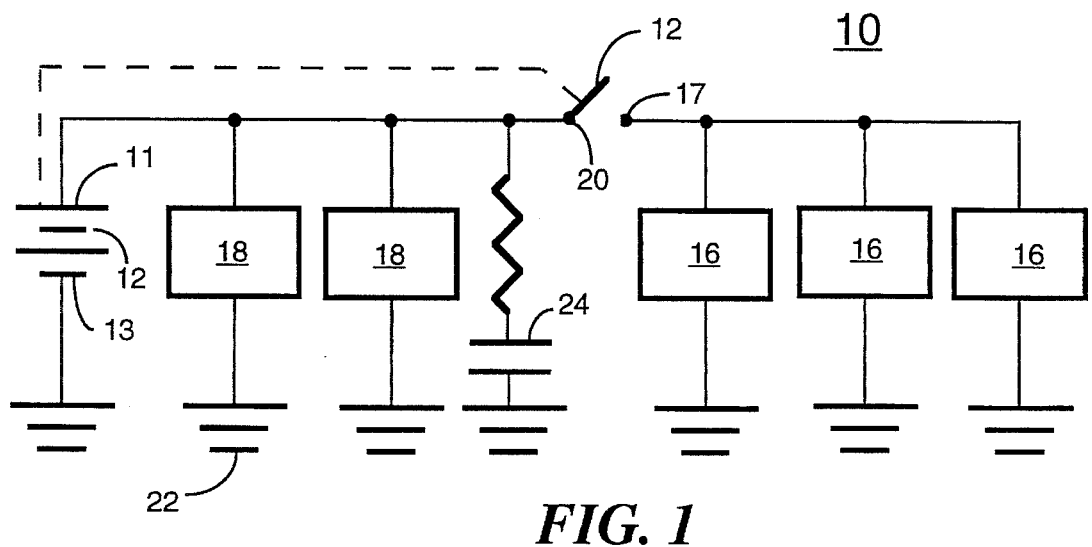
FIG. 1 is a block diagram of a power switch arrangement in accordance with the present invention.

Referring to FIG. 1, there is shown a block diagram of split battery contact arrangement 10 for a low voltage portable electronic product such as a wrist-worn pager or other communication device. Circuitry within a low voltage portable communication device such as a pager typically comprises a light resistive load portion 18 and a relatively higher resistive (or impedance) load portion 16. The light resistive load portion typically includes devices such as microprocessors and memory (RAM, DRAMs, SRAMs) and the relatively higher resistive load portion typically includes sensory alerting circuitry such as audio transducers, lamps (LED's), or vibrators.

The split battery contact arrangement 10 has a first positive contact point 20 which is selectively isolatable from a second positive contact point 17. The light resistive load portion 18 is coupled to the first contact point 20 while the relatively higher resistive load 16 is coupled to the second contact point 17. A back-up energy source 24 is coupled to the first positive contact point 20. The back-up energy source 24 is preferably a capacitor or a low voltage button cell. Finally, a battery 12, having a positive contact 13 and a negative contact 11 is used to couple the light resistive load 18 to the relatively higher resistive load 16 by connecting the first positive contact point 20 to the second positive contact point 17. Battery 12 is preferably a primary battery such as a zinc-air battery. The battery 12 is also used to selectively isolate the light resistive load 18 from the relatively higher resistive load 16 when the battery 12 is removed. Thus, the removal of the battery 12 also disconnects the back-up energy source 24 from the relatively higher resistive load 16. Therefore, the back-up battery 24 is protected from rapid depletion of energy or current drain from the load 16 when the battery 12 is removed.

Figure 2:
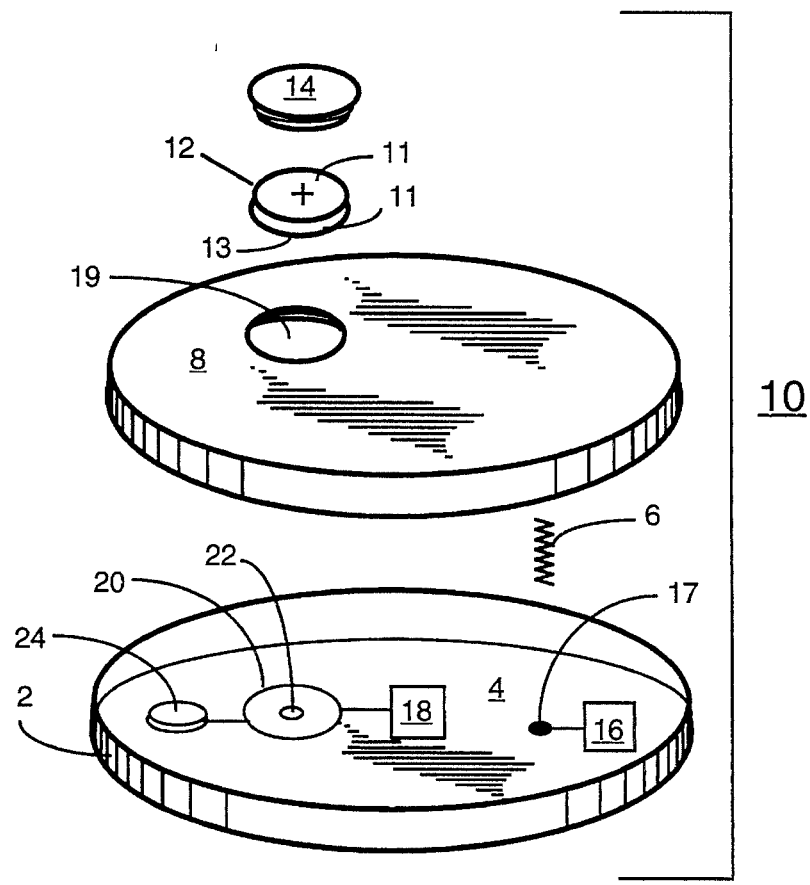
FIG. 2 is an exploded perspective view of a low voltage portable electronic product having a power switch arrangement in accordance with the present invention.

Referring to FIG. 2, there is shown an exploded perspective view of a low voltage portable electronic product having a split positive battery contact arrangement in accordance with the present invention. Again, the low voltage portable electronic product is preferably a wristwatch pager, and, as shown, a first circuit 18 such as a light resistive load (a microprocessor and/or memory) and a second circuit 16 such as a relatively higher resistive load (an audio transducer, a lamp, or a vibrator) both preferably reside on a circuit board 4 within a watchcase 2. The wristwatch pager further includes a watch caseback 8 which mounts within the watchcase 2. The watch caseback 8 is preferably conductive and serves as part of the split positive contact arrangement by coupling to the second positive contact 17, in this case via an optional spring 6. Of course, the caseback 8 can be connected to the second positive contact 17 using a elastomeric connector, or an integral solid stem protruding below the caseback or other means as know in the art.

As shown, once the caseback 8 is assembled together with the watchcase 2, the caseback 8 is fixed or connected to the second circuit 16 (or the relatively higher resistive load 16) via the spring 6. Thus, when a battery 12 having a positive terminal 11 on the top surface and the same positive terminal 11 on the periphery of the cell and a negative terminal 13 on the bottom surface of the cell is inserted into an aperture 19 in the caseback 8, a potential connection can be made between the first circuit 18 and the second circuit 16. A battery cover 14 (preferably made of a conductive metal), when inserted or screwed into the aperture 19, ensures that the appropriate connection is made between the first positive contact 20 and the positive terminal 11 on the periphery of the battery 12. Additionally, once the cover 14 is in place, the connection between a first negative contact 22 and the negative terminal 13 of the battery 12 is assured. Finally, once the cover 14 is in place, the positive terminal 11 in both the periphery and top surface of the battery 12 assure the appropriate connection between the first positive contact 20 and the second positive contact 17 (and thus the first and second circuits 18 and 16 respectively) via the caseback 8 (and optionally via the spring 6).

Operationally, when the battery door 14 is opened, and particularly if the bottom of the battery 12 is spring loaded, the first circuit 18 will be isolated from the second circuit 16 in a simple and effective manner without any additional circuitry required. Once the battery 12 is removed, the backup energy source 24 will not be subjected to current drain from the second circuit 16. Please note, that although not shown in FIG. 2, the backup energy source is coupled to ground (22) as shown in FIG. 1. Thus, low current drain or low resisitive load circuitry in the first circuit 18 is always protected from a sudden depletion of current from a second circuit 16 since it is connected to the back-up energy source 24 and the split positive contact arrangement in accordance with the present invention.

The present invention has been described in detail in connection with the disclosed embodiments. These embodiments, however, are merely examples and the invention is not restricted thereto. It will be understood by those skilled in the art that variations and modifications can be made within the scope and spirit of the present invention as defined by the appended claims.

What is claimed is:

1. A split battery contact arrangement for a low voltage portable electronic product having a light resistive load portion and a relatively higher resistive load portion, comprising:

a split positive battery contact having a first positive contact point selectively isolatable from a second positive contact point, the relatively higher resistive load portion being selectively coupled to the second positive contact point when a battery is inserted between the first and second positive contact point, the relatively higher resistive load portion being completely isolated from the light resistive load portion when the battery is removed: and a back-up energy source and the light resistive load portion coupled to the first positive contact point.

2. The split battery contact arrangement of claim 1, wherein the portable electronic product comprises a wristwatch pager.

3. The split battery contact arrangement of claim 1, wherein the relatively higher resistive load comprises a sensory alerting circuit such as an audio transducer, a lamp, or a vibrator.

4. The split battery contact arrangement of claim 1, wherein the relatively lower resistive load comprises a microprocessor and memory devices.

5. The split battery contact arrangement of claim 1, wherein the backup energy source comprises a capacitor.

6. The split battery contact arrangement of claim 1, wherein the means for coupling comprises a zinc-air battery.

7. A low voltage portable electronic product having a split battery contact arrangement, comprising:

a split positive battery contact having a first positive contact point selectively isolatable from a second positive contact point, a relatively higher resistive load portion being selectively coupled to the second positive contact point;

a back-up energy source and a light resistive load portion coupled to the first positive contact point; and a battery having a positive contact used for coupling the first positive contact point to the second positive contact point.

8. The low voltage portable electronic product of claim 1, wherein the portable electronic product comprises a wristwatch pager.

9. The low voltage portable electronic product of claim 1, wherein the relatively higher resistive load comprises a sensory alerting circuit such as an audio transducer, a lamp, or a vibrator.

10. The low voltage portable electronic product of claim 1, wherein the relatively lower resistive load comprises a microprocessor and memory devices.

11. The low voltage portable electronic product of claim 1, wherein the back-up energy source comprises a capacitor.

12. The low voltage portable electronic product of claim 1, wherein the means for coupling comprises a zinc-air battery.

13. The low voltage portable electronic product of claim 8, wherein the relatively higher resistive load and the relatively lower resistive load reside on a circuit board within a watchcase and wherein a watch caseback and a contact point on the circuit board coupled to the relatively lower resistive load forms the split positive battery contact.

14. The low voltage portable electronic product of claim 13, wherein the caseback is coupled to the relatively higher resistive load via a spring.

15. The low voltage portable electronic product of claim 13, wherein the battery comprises a zinc-air battery.

16. A split battery contact arrangement for a low voltage portable electronic product having a first circuit and second circuit, comprising:

a split positive battery contact having a first positive contact point selectively isolatable from a second positive contact point, the first positive contact point coupled to the first circuit;

a back-up energy source and the second circuit coupled to the second positive contact point; and a removable battery, when removed selectively and completely isolates the first circuit from the second circuit and which when inserted couples the first circuit to the second circuit.

17. The low voltage portable electronic product of claim 16, wherein the second circuit comprises a sensory alerting circuit such as an audio transducer, a lamp, or a vibrator and the first circuit comprises a microprocessor and memory devices.

18. The low voltage portable electronic product of claim 17, wherein the portable electronic device is a communication device in the form of a watch and wherein the first circuit and the second circuit reside on a circuit board within a watchcase and wherein a watch caseback and a contact point on the circuit board coupled to the first circuit forms the split positive battery contact.

19. The low voltage portable electronic product of claim 18, wherein the caseback is couple to the second circuit via a spring.

20. The low voltage portable electronic product of claim 16, wherein the battery comprises a zinc-air battery.

* * * * *